United States Patent [19]

Secrist et al.

[11] Patent Number: 5,639,807
[45] Date of Patent: Jun. 17, 1997

[54] PROCESS FOR MANUFACTURING CARBON FIBER PELLETS, THE HIGH DENSITY, STREAMLINED PELLETS RESULTING THEREFROM AND PROCESS FOR PRODUCING REINFORCED THERMOPLASTIC RESINS EMPLOYING THE PELLETS

[75] Inventors: Duane R. Secrist; William M. Jenkins, both of Knoxville, Tenn.

[73] Assignee: Akzo Nobel nv, Netherlands

[21] Appl. No.: 286,267

[22] Filed: Aug. 5, 1994

[51] Int. Cl.$^6$ .................................................. C08K 3/00
[52] U.S. Cl. ..................... 523/215; 523/205; 423/447.1; 423/447.2; 428/317; 428/375; 428/392; 428/394; 524/496
[58] Field of Search .................. 423/447.1, 447.2; 523/205, 215; 428/392, 394, 367, 375; 524/496

[56] References Cited

U.S. PATENT DOCUMENTS

| | | | |
|---|---|---|---|
| 2,489,373 | 5/1944 | Gilman | 260/37 |
| 4,394,478 | 7/1983 | Martin | 524/424 |
| 4,818,615 | 4/1989 | Luxon et al. | 428/407 |
| 5,227,238 | 7/1993 | Hirari et al. | 428/367 |
| 5,525,180 | 6/1996 | Paul, Jr. et al. | 156/280 |

FOREIGN PATENT DOCUMENTS

| | | |
|---|---|---|
| 0056703 | 7/1982 | European Pat. Off. . |
| 0278546 | 8/1988 | European Pat. Off. . |
| 0338919 | 10/1989 | European Pat. Off. . |
| 0415436 | 3/1991 | European Pat. Off. . |
| 60-038465 | 2/1985 | Japan . |
| 3056566 | 3/1991 | Japan . |
| 4024259 | 1/1992 | Japan . |
| 4292462 | 10/1992 | Japan . |
| 4300353 | 10/1992 | Japan . |
| 2150936 | 7/1985 | United Kingdom . |

*Primary Examiner*—Edward J. Cain
*Attorney, Agent, or Firm*—Dilworth & Barrese

[57] ABSTRACT

Carbon fiber pellets having improved flow characteristics are prepared by mixing chopped or milled carbon fibers with a solution or suspension of a sizing agent, shaping the agglomerated mixture on a tilted rotating surface to provide dense pellets of streamlined shape and drying the pellets. The carbon fiber pellets are especially suitable for use in the manufacture of reinforced thermoplastic resins.

14 Claims, 2 Drawing Sheets

(a)   (b)

(c)   (d)

(e)   (f)

PROCESS FOR MANUFACTURING CARBON FIBER PELLETS, THE HIGH DENSITY, STREAMLINED PELLETS RESULTING THEREFROM AND PROCESS FOR PRODUCING REINFORCED THERMOPLASTIC RESINS EMPLOYING THE PELLETS

BACKGROUND OF THE INVENTION

This invention relates to a process for manufacturing carbon fiber pellets, the resulting pellets and the use of the pellets in the production of reinforced thermoplastic resins.

Carbon fiber reinforced thermoplastic resins are conventionally manufactured by batch blending carbon fiber with thermoplastic resin and feeding the blend to an extruder/compounder. The resulting extrudate is formed into molded articles employing conventional injection molding or extrusion molding techniques. Developments in the compounding industry have recently favored feeding the carbon fiber separately from the resin pellets/powder. The carbon fiber is typically introduced into the polymer melt in an effort to minimize the mechanical degradation of the fiber length. Separate feeding of the carbon fiber requires precise metering of the carbon fiber addition. Economic concerns for high volume production require a free-flowing carbon fiber product form. Conventional carbon fiber forms are manufactured by cutting a carbon fiber strand made up of carbon filaments bundled together with a sizing agent into short lengths, e.g., 3–10 mm or so. The cutting operation necessarily results in blunt-ended forms, e.g., as shown in U.S. Pat. No. 4,818,615. Similar forms are described in U.S. Pat. No. 5,227,238 and EPA 338,919.

The flow characteristics of the various carbon fiber product forms have a significant impact on the feeding and metering behavior of the fiber. Two of the principal factors influencing the flow characteristics of a given carbon fiber product form (other than its dimensions) are its density and its shape. For optimum flow characteristics, a carbon fiber product form should have a fairly high bulk density and relatively low flow-resistance, i.e., a streamlined shape. Product forms produced by a strand-cutting technique such as described in aforementioned U.S. Pat. Nos. 4,818,615 and 5,227,238 and EPA 338,919 might possess a suitably high level of bulk density but their blunt-ended configurations are not conducive to low flow-resistance. Although it is known from Japanese Patent No. 4,300,353 that a spherical carbon fiber pellet can be obtained by mixing carbon fibers with a solution of polymer as a sizing agent in an apparatus having a tumbling and flowing action, any advantage in flow properties owing to the streamlined shape of the pellet is more than offset by its low density which is on the order of 0.05–0.15 g/cc (50–150 g/l). Thus, the spherical pellets described in Japanese Patent No. 4,300,353, indicated to be useful therein as insulating material, reinforcement for carbon material, filters and adsorption equipment, would not be suitable for use in conventional reinforced thermoplastic resin manufacturing operations.

Heretofore, no carbon fiber pellet manufacturing process has been able to provide a product which at the same time possesses high density and a streamlined morphology, characteristics which combine to yield low resistance to flow. A process capable of producing such a product and, of course, the product itself, would represent a significant advance in the technology of carbon fiber reinforcements for thermoplastic resins.

SUMMARY OF THE INVENTION

It is an object of this invention to provide a process for the manufacture of a carbon fiber pellet suitable for use in the production of reinforced thermoplastic resins.

It is a particular object of the invention to provide a process for the manufacture of a carbon fiber pellet having a streamlined shape, e.g., a seed-like or spherical configuration, and a bulk density of at least about 300 g/l.

In keeping with these and other objects of the present invention there is provided a process for manufacturing carbon fiber pellets which comprises:

a) mixing cut carbon fibers with a solution or suspension of a sizing agent to form wet, sized carbon fiber agglomerates;

b) contacting the agglomerates with a tilted rotating surface for a period of time sufficient to form densified wet streamlined carbon fiber pellets; and, c) drying the densified wet pellets to provide streamlined carbon fiber pellets possessing a density of at least about 300 g/l.

In addition to the foregoing process, the subject invention includes the resulting streamlined carbon fiber pellets and the use of the pellets in producing reinforced thermoplastic resins.

In contrast to the carbon fiber pellets that are produced by the procedures described in U.S. Pat. Nos. 4,818,615 and 5,227,238, EPA 338,919 and Japan 4,300,353, the carbon fiber pellets resulting from the process of this invention are both streamlined and dense, characteristics which impart excellent flow characteristics making them ideal for use in conventional reinforced thermoplastic resin manufacturing operations.

The term "streamlined" shall be understood herein to refer to any shape or configuration which provides less resistance to flow than a blunt-ended pellet of the same volume and density. While the term is specifically illustrated herein with the shapes of the pellets shown in FIGS. 2 and 3, infra (i.e., seed-like or ellipsoidal and spherical or spheroidal), other flow resistance-reducing shapes are contemplated, e.g., lens-like or convexo-convex, tear-like, etc.

DESCRIPTIONS OF THE PREFERRED EMBODIMENTS

The principal components of the carbon fiber pellets herein are carbon fibers, or filaments, and a sizing agent.

The expression "carbon fibers" shall be understood herein to include graphite fibers and these fibers coated with another material, e.g. an inorganic material such as a metal or metallic compound or an organic material such as a polymer, etc. Further included are carbon fibers which have been mechanically and/or chemically treated to modify one or more of their properties. Thus, fibers which have been surface-treated can be used to improve bonding to the sizing agent and/or the matrix thermoplastic resin.

The fibers herein are cut from tows containing from about 1,000 to 2,000,000, and preferably from about 50,000 to about 700,000, individual fibers or filaments. The tows can possess deniers on the order of from about 700 to about 1.5 million, and preferably from about 35,000 to about 500,000, denier.

Figure 2:
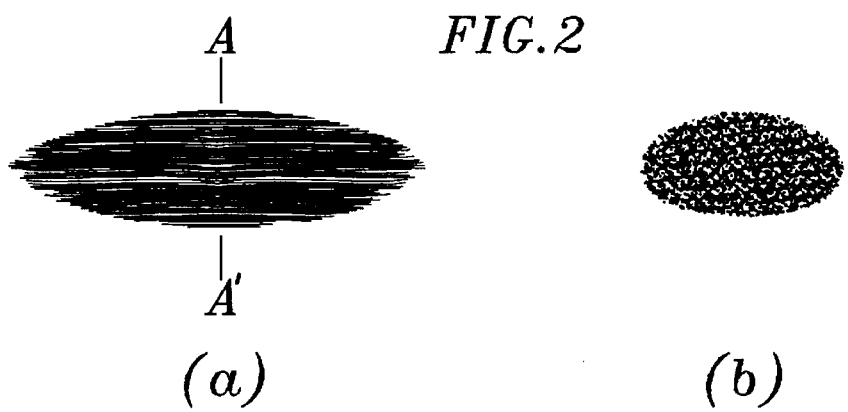
Figure 2:
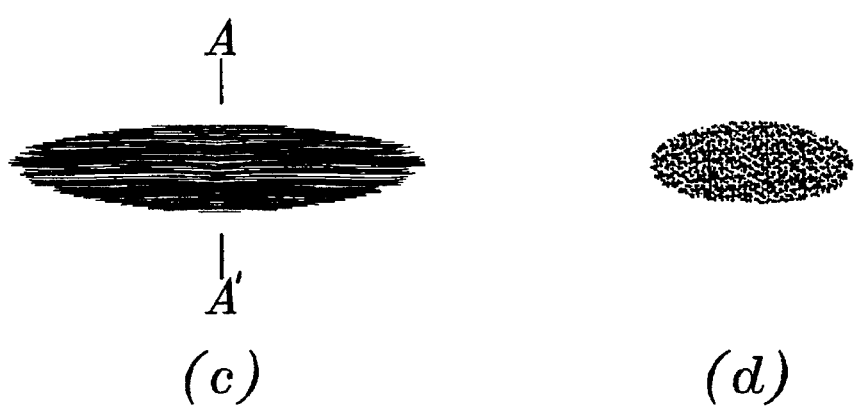
Figure 2:
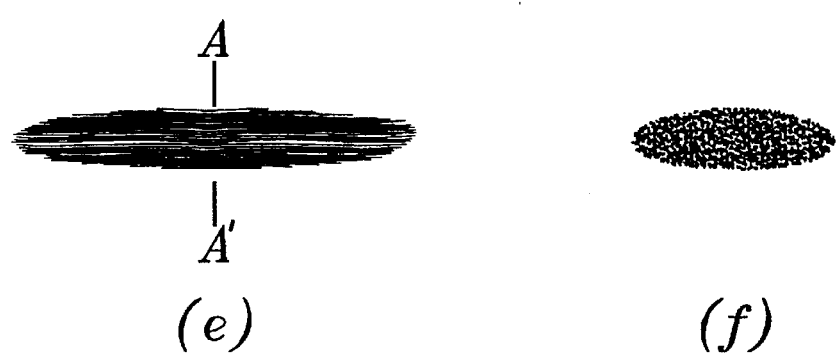

When chopped carbon fibers are employed, one obtains a carbon fiber pellet having a seed-like or ellipsoid shape, e.g., as shown in FIG. 2. It is preferred to employ chopped carbon fibers possessing an average length of from about 1 to about 10, and preferably from about 2 to about 8, mm, an average diameter of from about 2 to about 20, and preferably from about 5 to about 12, microns and a length to diameter ratio of from about 200:1 to about 1200:1, and preferably from about 300:1 to about 1000:1.

Figure 3:
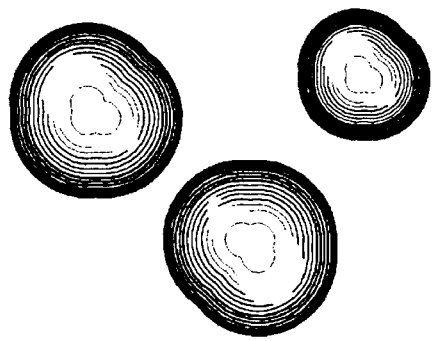

When milled carbon fibers are employed, one obtains a carbon fiber pellet having a spherical or spheroidal shape, e.g., as shown in FIG. 3. It is generally preferred to use milled carbon fibers possessing an average length of less than about 1, and preferably less than about 0.6, mm, an average diameter of less than about 20, and preferably less than about 10, microns and a length to diameter ratio of from about 5:1 to about 150:1, and preferably from about 8:1 to about 120:1.

Essentially any sizing agent heretofore employed in the bundling of carbon fibers to make carbon fiber forms can be used herein. In general, polymeric resins are preferred. Thus, the sizing agent can be a solution or suspension of a thermoplastic or thermosetting resin including that on an epoxy resin, urethane-modified epoxy resin, polyester resin, phenol resin, polyamide resin, polyurethane resin, polycarbonate resin, polyetherimide resin, polyamideimide resin, polyimide resin, bismaleimide resin, polysulfone resin, polyethersulfone resin, epoxy-modified urethane resin, polyvinyl alcohol resin, polyvinyl pyrrolidone resin, and the like. Depending on the nature of the sizing resin, the solvent or suspending agent for the resin can be water, an alcohol such as methanol or ethanol, a ketone such as methyl ethyl ketone or acetone, a hydrocarbon such as cyclohexane, toluene or xylene, a halogenated hydrocarbon such as dichloromethane, an amide such as N-methyl pyrrolidone or dimethyl formamide, an ether such as tetrahydrofuran, and the like.

The concentration of sizing resin in the solvent/suspending medium can vary over fairly wide limits, e.g., from about 1 to about 55, and preferably from about 5 to about 35, weight percent. Specific sizing agents that can be used with generally good results include a waterborne polyurethane having a solids content of from about 3 to about 35 weight percent, a waterborne epoxy resin having a solids content of from about 3 to about 55 weight percent and an aqueous solution of from about 2 to about 8 weight percent polyvinylpyrrolidone.

In general, it is preferred to use the minimum amounts of sizing agent to achieve the desired result. However, amounts of sizing greater than the minimum are not excluded. Thus, e.g., an amount of sizing agent solution/suspension can be used which will provide from about 0.5 to about 10, and preferably from about 0.8 to about 6, weight percent of sizing in the product carbon fiber pellets.

In addition to the carbon fiber and sizing components, the carbon fiber pellets herein can contain sizable amounts of one or more other ingredients, e.g., other fibers, carbon black, glass powder, aramid pulp, recycled milled carbon fiber pellets, etc., for a total amount of such ingredients of up to about 50 weight percent of the pellets. These and other optional ingredients are conveniently combined with the carbon fibers and/or the solution/suspension of sizing agent prior to or during the mixing of the carbon fibers with the sizing agent.

Figure 1:
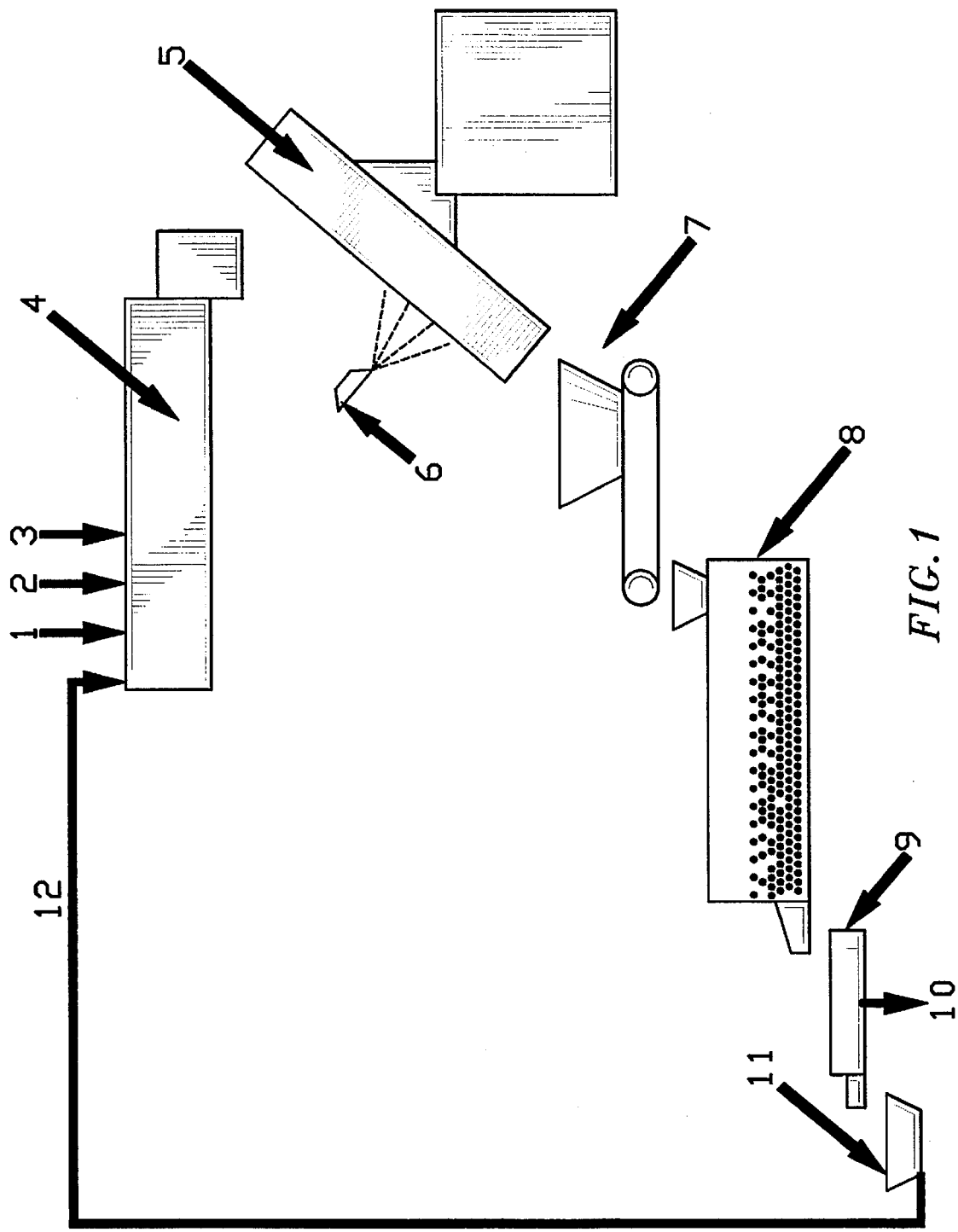
FIG. 1 is a schematic flow diagram of one embodiment of the process of the invention for manufacturing carbon fiber pellets; and, FIGS. 2 and 3 illustrate variously shaped carbon fiber pellets which can be obtained by the process of the invention.

In the flow diagram of FIG. 1 which illustrates the manufacture of carbon fiber pellets as shown in FIG. 2 and 3, cut carbon fibers, i.e., those which have been chopped or milled, supplied at 1 and a solution or suspension of sizing resin, e.g., a waterborne polyurethane containing 1–35 weight percent resin, together with any optional ingredients such as those mentioned above supplied at 2 and 3 are introduced in predetermined amounts, e.g, to provide approximately 3–6 weight percent sizing, to mixer 4 where agglomerization of the sized fibers takes place. Advantageously, where chopped carbon fibers are employed, the fibers are chopped in the presence of a suitable liquid, e.g., water when the sizing agent is dissolved or suspended in water, prior to introduction into the mixer. Amounts of liquid of from about 15 to about 65, and preferably from about 20 to about 55, weight percent of the carbon fibers are generally suitable in preparing the chopped fibers. Where milled fibers are used, it is generally convenient to add such fibers to the mixer in the dry state.

The carbon fiber agglomerates resulting from the mixing operation are discharged into rotary disc pelletizer 5. The pelletizer can be operated throughout a broad range of angles and disc speeds to provide sufficient action to build and densify the pellets. For example, angles of from about 40° to about 70°, and preferably from about 45° to about 60°, from the horizontal and disc speeds of from about 8 to about 60, and preferably from about 10 to about 50, rpm can advantageously be utilized. Periods of operation for batch-mode manufacturing can vary from about 2 to about 30, and preferably from about 5 to about 20, minutes for most pellet sizes. In continuous-mode manufacturing, the average residence time of the carbon fiber agglomerates in the pelletizer can vary from about 10 to about 60, and preferably from about 15 to about 30, minutes depending on the feed rate and capacity of the pan. Periods of time more or less than those stated can, of course, be employed depending upon the shape, density and size of the product pellets desired. Spray unit 6 associated with pelletizer 5 can introduce additional liquid into the pelletizer if desired, e.g., such being preferred when manufacturing the carbon fiber pellets shown in FIG. 3 in order to aid in nucleation and growth of the pellets. The wet product pellets are discharged from the pelletizer into bin/conveyor 7 and transferred to vibrating dryer 8 where the pellets are dried at a temperature of from about 120° to about 350° C. The dried carbon fiber pellets are then introduced onto vibrating screen unit 9 where they are classified into suitably sized and oversized product. The suitably sized pellets, are discharged at 10 and sent to the bagging operation and the oversized material is transferred to mill 11 where it is ground to particles and recycled through 12 to mixer 4.

The carbon fiber pellets of this invention possessing a seed-like or ellipsoid configuration as shown in FIG. 2 have a maximum length of from about 4 to about 20, and preferably from about 9 to about 16, mm, an maximum width of from about 0.5 to about 5, and preferably from about 2 to about 4, mm, a maximum thickness of from about 0.5 to about 5, and preferably from about 2 to about 4, mm, an average bulk density of at least about 300 g/liter and preferably an average bulk density of from about 400 to about 700 g/liter and contain an average of from about 5,000 to about 200,000 fibers per pellet. The fibers comprising a pellet shown in FIG. 2 are for the most part commonly oriented, i.e., they are largely in alignment with the longitudinal axis of the pellet. Each of the pellets illustrated in FIG. 2, i.e., embodiments (a), (c) and (e), possess cross sections A—A' shown in corresponding figures (b), (d) and (f).

The carbon fiber pellets of this invention possessing a spherical or spheroidal configuration as shown in FIG. 3 have an average diameter of about 0.8 to about 8, and preferably from about 0.9 to about 7, mm, an average bulk density of at least about 300 g/liter and preferably an average bulk density of from about 400 to about 700 g/liter and contain from about 100,000 to about 2,000,000 fibers per pellet. In contrast to the carbon fiber pellets of FIG. 2, the carbon fibers in the pellets of FIG. 3 are largely randomly ordered.

The carbon fiber pellets herein can be added to any of a wide variety of thermoplastic resins and thermoplastic resin blends as a reinforcement component. Suitable resins include polycarbonate resins, polyamide resins, saturated polyester resins (e.g., polybutyleneterephthalate resins (PBT) and polyethyleneterephthalate resins (PET)), polyurethane resins, polyacetal resins, polysulfone resins, polyether sulfone resins (PES), polyphenylene sulfide resins (PPS), polystyrene resins (PS), polyolefin resins, polyvinyl chloride resins, polyetherketone resins (PEK), polyetheretherketone resins (PEEK), polyetherimide resins (PEI), polyarylene oxide resins, polyphenylenesulfide resins (PPS), polyamideimide resins, polyarylate resins, thermoplastic polyimide resins and acid modified polyolefin resins, and compatible blends of the foregoing.

The following examples are illustrative of the process of this invention for manufacturing carbon fiber pellets and the pellets thus obtained.

Examples 1–4 illustrate a batch-mode operation for making the seed-shaped pellets shown in FIG. 2 and Examples 5 and 6 illustrate a batch-mode operation for making the spherical pellets shown in FIG. 3. A continuous-mode operation for making the pellets of FIG. 2 is illustrated in Examples 7–9 and a continuous-mode operation for making the pellets of FIG. 3 is illustrated in Examples 10–12.

EXAMPLE 1

A. Mixing

Chopped carbon fibers, 400 g, possessing an average length of about 6 mm and an average diameter of about 8 microns were charged to a laboratory scale mixer (Eirich Machines Ltd Model RV02) and with the mixer in operation, 20 g of a waterborne polyurethane containing 6.6 g (33 weight percent) solids and 87 g additional water were introduced to the mixer. After 2 minutes of mixing, an additional 20 g of the waterborne polyurethane and 87 g water were added with mixing continuing for another minute for a total mixing time of 3 minutes. The carbon fiber agglomerates were then discharged into a rotary disc pelletizer (Eirich Machines Ltd Model TR10).

B. Pelletizing

The agglomerated carbon fibers from the mixing operation were pelletized in the rotary disc pelletizer operating at about 55° from the horizontal and 30 rpm for about 10 minutes causing the aggregates to accrete and densify into seed-like pellets.

C. Drying

The wet pellets from the pelletizing operation were dried in a laboratory oven at 120° C. for 60 minutes. The dried, seed-shaped pellets possessed the following properties:

| | |
|---|---|
| length | 13–16 mm |
| width | 3–4 mm |
| thickness | 2–3 mm |
| average bulk density | 333 g/l |
| vibratory flow rate | 148 lb/hr |
| sizing resin | 3 wt % |

In this and all of the other examples which follow, vibratory flow rate was measured upon a vibratory flow table having an in-line vibrator (Craftsman Model No. 315.116131) attached to the bottom of a 30×16 inch tray pitched at a 5° angle from the horizontal. The vibrator was operated at 4,000 oscillations per minute with a voltage controlled amplitude of about 32 volts. The tray was initially filled with 200 grams of carbon fiber product. Average flow rates were determined by measuring the time and weight of product discharged from the tray.

D. Use of the Pellets in Providing Reinforced Polycarbonate Resin

Polycarbonate was introduced into the entrance of a twin screw compounder and 20 weight percent of the dried, seed-shaped pellets of this example was introduced into a side feeder located at the midpoint of the compounder barrel resulting in addition of the pellets directly into the polycarbonate melt. Feed rate was approximately 100 lb/hour.

EXAMPLES 2–4

The procedure of Example 1 was followed but with the variations and the results shown below.

| Example | Variation(s) From the Process of Example 1 | Average Dimensions (mm) of Dried, Seed-Shaped Pellets Length/Width/Thickness | Sizing Resin (wt %) | Average Bulk Density (g/l) | Vibratory Flow Rate (lb/hr) |
|---|---|---|---|---|---|
| 2 | 9 minutes total mixing time | 9/3/3 | 3 | 313 | 153 |
| 3 | 80 g total waterborne polyurethane; 148 g total additional water | 18/5/4 | 6 | 476 | 231 |
| 4 | 80 g total waterborne polyurethane; 148 g total additional water; 6 minutes total mixing time | 12/4/4 | 6 | 417 | 180 |

Employing the same compounding procedure as described in Example 1, 20 weight percent of the pellets of Example 2 were introduced as reinforcement in polycarbonate resin.

EXAMPLE 5

Milled carbon fibers, 500 g, possessing an average length of about 0.5 mm and a diameter of about 8 microns and 50 g carbon black were charged to the laboratory mixer referred to in Example 1 and with the slow addition of 50 g waterborne polyurethane (33 weight percent solids) and 297 g additional water, the contents of the mixer were mixed for a total of 6 minutes. Following pelletizing and drying as in Example 1, dried product carbon fiber pellets of approxi-

| Example | Variation(s) From the Process of Example 7 | Average Dimensions (mm) of Dried, Seed-Shaped Pellets Length/Width/Thickness | Sizing Resin (wt %) | Average Bulk Density (g/l) | Vibratory Flow Rate (lb/hr) |
| --- | --- | --- | --- | --- | --- |
| 8 | waterborne polyurethane at 1.9 gal/hr (16 lb/hr) | 10/3/2 | 3 | 488 | 198 |
| 9 | aqueous epoxy emulsion (12.9 wt % solids) at 3.0 gal/hr (25.2 lb/hr) | 8/2/2 | 7 | 377 | 174 | mately spherical shape were obtained having the following properties:

| average diameter | sizes ranging from 2 mm to 4 mm |
| --- | --- |
| average bulk density | 458 g/l |
| sizing resin | 3 wt % |

EXAMPLE 6

The procedure of Example 5 was followed but with 50 g aramid pulp in place of carbon black and utilizing 363 g additional water. The dried approximately spherical pellets possessed the following properties:

| average diameter | 3 mm |
| --- | --- |
| average bulk density | 430 mm |
| sizing resin | 3 wt % |

EXAMPLE 7

Chopped fibers of approximately 3 mm average maximum length and 8 microns average maximum diameter at a rate of 50 lb/hr and a waterborne polyurethane (9.95 weight percent solids) at a rate of 1.7 gal/hr (14.3 lb/hr) were continuously introduced into a pin mixer (Ferro Tech Model 12T35) with the sized fiber agglomerates being continuously discharged from the mixer into rotary disc pelletizer (Ferro Tech Model 036). After 20 minutes in the pelletizer operated at 55° and 30 rpm, wet pellets were continuously fed through a fluidized bed dryer (Carrier Vibrating Equipment, Inc., Model QAD-1260S) at 215° C. at a rate of approximately 100 lb/hr where they were dried and de-dusted. The seed-like pellets had the following properties:

| length | 6–8 mm |
| --- | --- |
| width | 1.5–2 mm |
| thickness | 1.5–2 mm |
| average bulk density | 588 g/l |
| vibratory flow rate | 170 lb/hr |
| sizing resin | 2.5 wt % |

EXAMPLES 8–9

The procedure of Example 7 was followed but with the variations and the results shown below.

EXAMPLE 10

Milled carbon fibers possessing an average length of about 0.5 mm and an average diameter of about 8 microns at a rate of 170 lb/hr and a waterborne polyurethane (15.0 weight percent solids) at a rate of 4.0 gal/hr (33.6 lb/hr) were continuously introduced into the pin mixer of Example 7, the sized fiber agglomerates being continuously discharged into the rotary disc pelletizer of Example 7. After 30 minutes in the pelletizer operated at 55° and 30 rpm and with a continuous spray of water at the rate of 14 gal/hr being directed into the pelletizer bin as an aid to nucleation, wet pellets were discharged into the fluidized bed oven of Example 7 and dried under the conditions stated therein. The approximately spherical pellets had the following properties:

| average diameter | 4 mm |
| --- | --- |
| average bulk density | 488 g/l |
| vibratory flow rate | 130 lb/hr |
| screw feed rate | 133 lb/hr |
| sizing resin | 3 wt % |

EXAMPLE 11

The procedure of Example 10 was followed but with the following variations: feed rate of milled fibers to the mixer of 75 lb/hr; aqueous solution of polyvinylpyrrolidone (8.5 wt % PVP) at a feed rate of 1.8 gal/hr (15.1 lb/hr) as sizing agent; and, a water spray rate of 4.0 gal/hr into the pelletizer. The results were as follows:

| average diameter | 3 mm |
| --- | --- |
| average bulk density | 470 g/l |
| sizing resin | 2 wt % |

EXAMPLE 12

The procedure of Example 10 was followed but with the following variations: feed rate of milled fibers and 5 wt % carbon black to the mixer of 79 lb/hr; waterborne polyurethane (7.9 weight percent solids) of 1.8 gal/hr (15.1 lb/hr); and, a water spray rate of 4 gal/hr (15.1 lb/hr) into the bin of the pelletizer. The results were as follows:

| | |
|---|---|
| average diameter | 4 mm |
| average bulk density | 480 g/l |
| sizing resin | 1.5 wt % |

COMPARATIVE EXAMPLES 1–5

The following Table presents data for the bulk densities and flow rates of the carbon fiber pellets of Examples 1–12 and several known carbon fiber products (Comparative Examples 1–5):

| Carbon Fiber Product | Type of Carbon Fiber | Shape of Product | Bulk Density (g/l) | Vibratory Flow Rate (lb/hr) | Screw Feed* Rate (lb/hr) |
|---|---|---|---|---|---|
| Example 1 | chopped | seed-like pellet | 333 | 148 | — |
| Example 2 | chopped | seed-like pellet | 313 | 153 | — |
| Example 3 | chopped | seed-like pellet | 476 | 231 | — |
| Example 4 | chopped | seed-like pellet | 417 | 180 | — |
| Example 5 | milled | spheroidal pellet | 458 | — | — |
| Example 6 | milled | spheroidal pellet | 430 | — | — |
| Example 7 | chopped | seed-like pellet | 588 | 170 | — |
| Example 8 | chopped | seed-like pellet | 488 | 198 | — |
| Example 9 | chopped | seed-like pellet | 377 | 174 | 88 |
| Example 10 | milled | spheroidal pellet | 488 | 130 | 133 |
| Example 11 | milled | spheroidal pellet | 470 | — | — |
| Example 12 | milled | spheroidal pellet | 480 | — | — |
| Comp. Example 1 | strand | blunt-ended cylinders | 444 | 178 | — |
| Comp. Example 2 | strand | blunt-ended plates | 233 | 54 | — |
| Comp. Example 3 | milled | dry, loose milled fiber | 408 | 30 | 75 |
| Comp. Example 4 | strand | blunt-ended flakes | 345 | 117 | 53 |
| Comp. Example 5 | strand | blunt-ended flakes | 300 | — | 46 |

*K-Tron Soder North America Model K2MV560 60 mm single screw feeder operated at 325 rpm and low setting.

As these data show, for comparable bulk densities, the pellets of this invention exhibit significantly higher flow rates than the carbon fiber forms of the comparative examples. Thus, comparing the pellet product of Example 3 with the carbon fiber form of Comparative Example 1, the former possesses a vibratory flow rate which is nearly 30% higher than the latter, a result which is entirely disproportionate to the slightly higher density of the pellet of Example 3 (about 7% higher than the product of Comparative Example 1). As for pellets derived from milled carbon fibers, although the pellet of Example 10 possesses only 20% greater density that the product of Comparative Example 3, the former has a vibratory flow rate over 400 percent greater than the latter and a screw feed rate over 75 percent greater than the latter.

What is claimed is:

1. A process for manufacturing carbon fiber pellets which comprises:

a) wet-chopping carbon fibers from a carbon fiber tow containing from about 1,000 to 2,000,000 individual fibers or filaments to provide cut carbon fibers possessing an average length of from about 1 to about 10 mm and an average diameter of from about 2 to about 20 microns;

b) mixing the cut carbon fibers in the wet-chopped state with a solution or suspension of a sizing agent to form wet, sized carbon fiber agglomerates;

c) contacting the agglomerates with a tilted rotating surface for a period of time sufficient to form densified wet carbon fiber pellets possessing a or ellipsoid shape; and, d) drying the densified wet pellets to provide carbon fiber pellets of the aforesaid or ellipsoid shape possessing a density of at least about 300 g/l.

2. The process of claim 1 wherein the sizing agent is an aqueous suspension of polymer particles having a solids content of from about 1 to about 55 weight percent.

3. The process of claim 1 wherein the sizing agent is a waterborne polyurethane having a solids content of from about 3 to about 35 weight percent.

4. The process of claim 1 wherein the sizing agent is a waterborne epoxy resin having a solids content of from about 3 to about 55 weight percent.

5. The process of claim 1 wherein the sizing agent is an aqueous solution of from about 2 to about 8 weight percent polyvinylpyrrolidone.

6. The process of claim 1 wherein the tilted rotating surface is that of a rotary disc pelletizer.

7. The process of claim 1 wherein the tilted rotating surface is that of a rotary disc pelletizer operated at an angle of from about 40° to about 70° from the horizontal and a speed of from about 8 to about 60 rpm for a residence time of from about 2 to about 30 minutes.

8. The process of claim 1 wherein mixing is carried out in a pin mixer operated in continuous mode.

9. The process of claim 1 wherein mixing is carried out in a mixer operated in batch mode.

10. A carbon fiber pellet possessing a or ellipsoid shape having a bulk density of at least about 300 g/l.

11. The carbon fiber pellet of claim 10 possessing a length of from about 4 to about 20 mm, a width of from about 0.5 to about 5 mm and a thickness of from about 0.5 to about 5 mm.

12. The carbon fiber pellets of claim 10 having a bulk density of from about 400 to about 700 g/l.

13. A process of reinforcing a thermoplastic resin which comprises introducing into a thermoplastic resin a quantity of carbon fiber pellets possessing a seed-like or ellipsoid shape having a bulk density of at least about 300 g/l.

14. The process of claim 13 wherein the carbon fiber pellets possess a bulk density of from about 400 to about 700 g/l.

* * * * *

UNITED STATES PATENT AND TRADEMARK OFFICE
CERTIFICATE OF CORRECTION

PATENT NO. : 5,639,807
DATED : June 17, 1997
INVENTOR(S) : Duane R. Secrist, William M. Jenkins It is certified that error appears in the above-indentified patent and that said Letters Patent is hereby corrected as shown below:

On the Cover Sheet in "References Cited"
Under "U.S. Patent Documents" insert:
  --3,060,496    10/1962    McDowell et al         18/1
    4,339,402    7/1982     Henry                  264/40.1
    4,564,505    1/1986     Alfrey                 422/209--.
Under "Foreign Patent Documents" insert:
  --0368312      5/1990     European Pat. Off.
    1444441      7/1976     United Kingdom--.

In the Claims
  Claim 1 line 14 (at column 10 line 10), change "a or" to --an--; and
          line 17 (at column 10 line 50), delete "or".
  Claim 10 line 1 (at column 11 line 8), change "a or" to --an--.
  Claim 13 line 3 (at column 12 line 5), change "a seed-like or" to --an--.
In the Specification
-col. 3 line 21 change "on" to --of--.
-col. 4 line 51 change "an" to --a--.

Signed and Sealed this

Twenty-fifth Day of November, 1997

Attest:

Attesting Officer

BRUCE LEHMAN

Commissioner of Patents and Trademarks